Jan. 6, 1959
G. M. GROENENDYKE
2,867,775
TIME VARIABLE FILTER
Filed Nov. 25, 1953
2 Sheets-Sheet 1
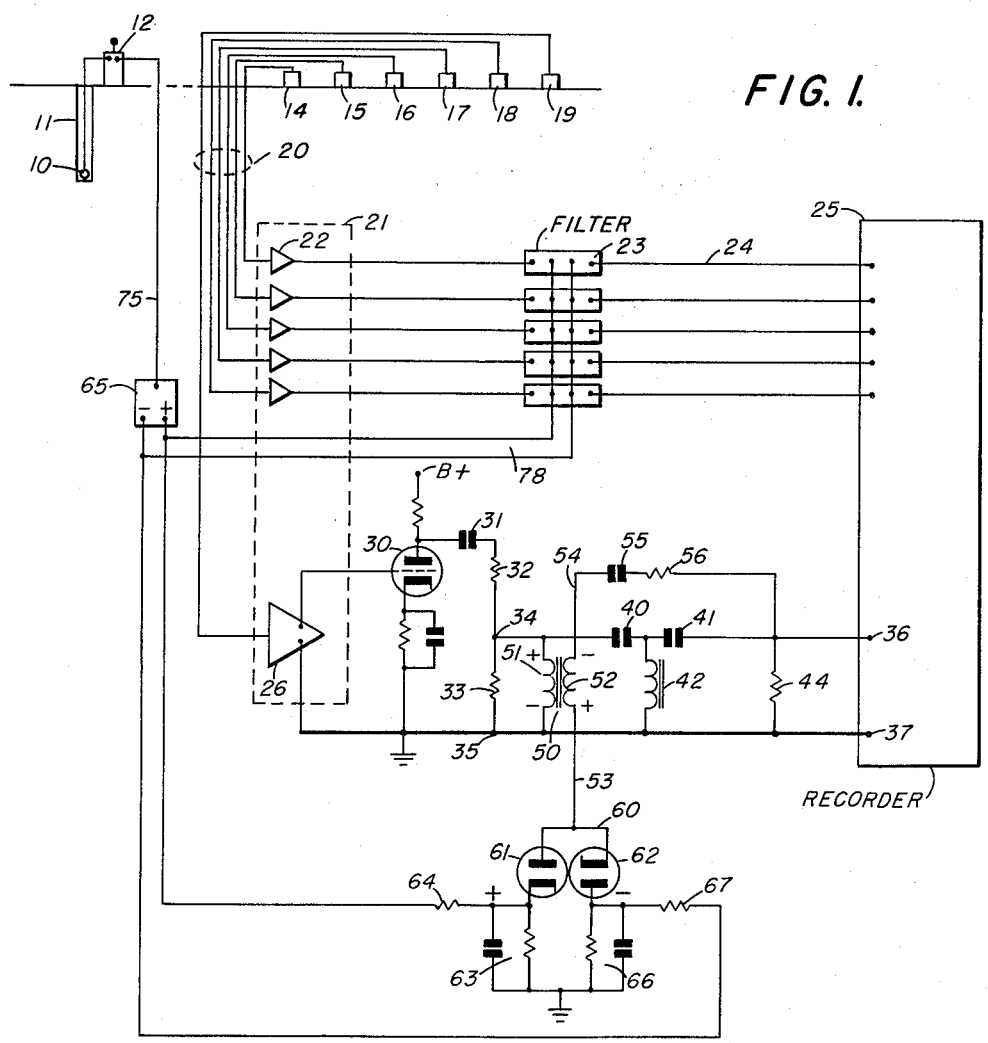
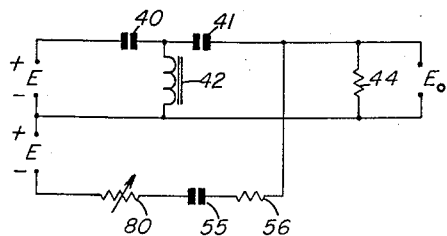
GOETHE M. GROENENDYKE
INVENTOR.
BY D. Carl Richards
ATTORNEY Jan. 6, 1959

G. M. GROENENDYKE 2,867,775

TIME VARIABLE FILTER

Filed Nov. 25, 1953

GOETHE M. GROENENDYKE
INVENTOR.

BY D. Carl Richards
ATTORNEY

United States Patent Office 2,867,775
Patented Jan. 6, 1959

2,867,775

TIME VARIABLE FILTER

Goethe M. Groenendyke, Dallas, Tex., assignor, by mesne assignments, to Socony Mobil Oil Company, Inc., a corporation of New York Application November 25, 1953, Serial No. 394,431

8 Claims. (Cl. 333—17)

This invention relates to seismic exploration and particularly concerns control of frequency response characteristics of systems utilized to amplify the seismic signals for recording purposes.

It is well known that the energy comprising seismic waves reflected from subsurface interfaces changes substantially in frequency composition over the time interval encompassed by a seismic record. In general it may be said that early arriving reflections from relatively shallow interfaces comprise high frequency energy components whereas later arriving reflections from deeper horizons in general are made up of lower frequency components. To facilitate interpretation of seismic records of energy produced by the detonation of an explosive charge the frequency response characteristics of the detecting and recording system may be varied to advantage in the interval following the explosion continuously to favor the predominant frequency of the waves to be recorded at any instant during the recording interval.

In accordance with the present invention, there is provided a seismic signal channel for amplifying and recording seismic waves which includes a filter network whose amplitude-frequency response varies as a predetermined function of time during a recording period following the generation of such waves. The filter includes a first path for transmission of electrical signals representative of the seismic waves from filter input terminals to filter output terminals. The first path has a fixed and predetermined amplitude-frequency response. A second path is then provided for transmission of signals from filter input terminals to filter output terminals and includes means for deriving signals from the input terminals in an inverted relation relative to those in the first path together with variable phase-amplitude means. There is then provided a variable control for the phase-amplitude means which is operative beginning with the instant corresponding to the instant of generation of the seismic waves and varying throughout the recording period.

For further objects and advantages of the invention and for a more complete description thereof, reference may now be had to the following description taken in conjunction with the accompanying drawings in which:

Fig. 1 diagrammatically illustrates a preferred form of filter means in a seismic surveying system;

Fig. 3 is a schematic representation of the system of Fig. 1; and

Figure 4:
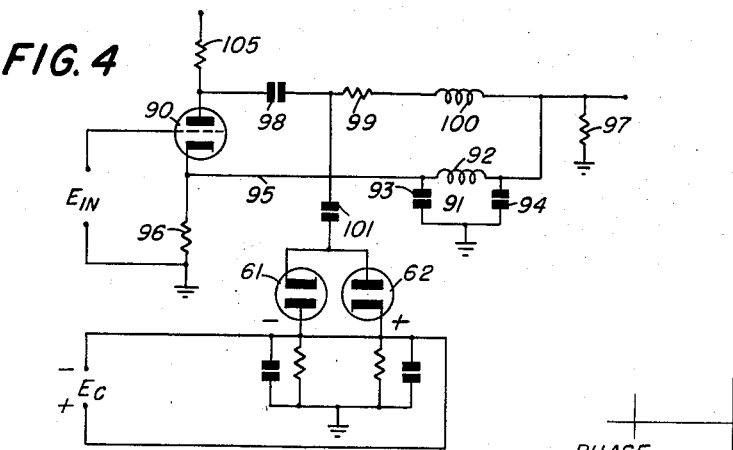
Fig. 4 is a modification of a portion of Fig. 1.

Referring now to Fig. 1, there is illustrated a source of seismic waves such as an explosive charge 10 positioned in a shot hole 11 and connected to a detonating device such as a blaster 12. Upon detonation of charge 10, seismic waves travel downwardly to reflecting interfaces. At each interface a portion of the energy is directed back to the earth's surface where discrete bursts of energy appear and may be detected by geophones 14—19 forming a seismic spread. Signals from the geophones representing a composite of reflected energy and unwanted noise components are then transmitted by way of multiconductor cable 20 to amplifier bank 21. The first amplifier 22 is connected at its input to detector 14 and at its output to a filter 23 whose output in turn is connected by way of channel 24 to a recorder 25.

In accordance with the present invention, filter 23 may take the form of the circuit connected to the output of the last amplifier 26. The operation of this filter is such that during early portions of the seismic record, i. e. immediately following detonation of charge 10, the filter network highly attenuates low frequency components and passes only signals predominantly of high frequency content to recorder 25. Thereafter the amplitude-frequency response of the filter is modified continuously and in a predetermined manner to permit more low frequency energy to pass to recorder 25 and to eliminate substantial contributions of the high frequency components otherwise present in the early portion of the recording period.

While the following detailed description will concern itself principally with utilization of an initial impulse from detonating device 12 to start the change in selectivity of filters to treat signals from geophones 14—19, it will be apparent that the system may also be utilized in the selective treatment of seismic waves recorded in phonographically reproducible form for subsequent analysis. In that case the phonographically reproducible records would be produced having as broad a frequency band as desired. Thereafter during the filtering operations the frequency band could be limited or narrowed at a preselected point in the frequency spectrum and varied as a predetermined function of time such as will be now explained.

The filter network receives a signal at its input terminals from the anode of an amplifying tube 30 whose gridcathode circuit is excited by the output of amplifier 26. The anode of tube 30 is coupled by way of condenser 31 and resistor 32 to an impedance 33 which preferably has a value equal to the characteristic impedance of the associated filter. The input terminals of the filter may thus be considered to be the terminal 34 and the ground terminal 35.

Figure 2:
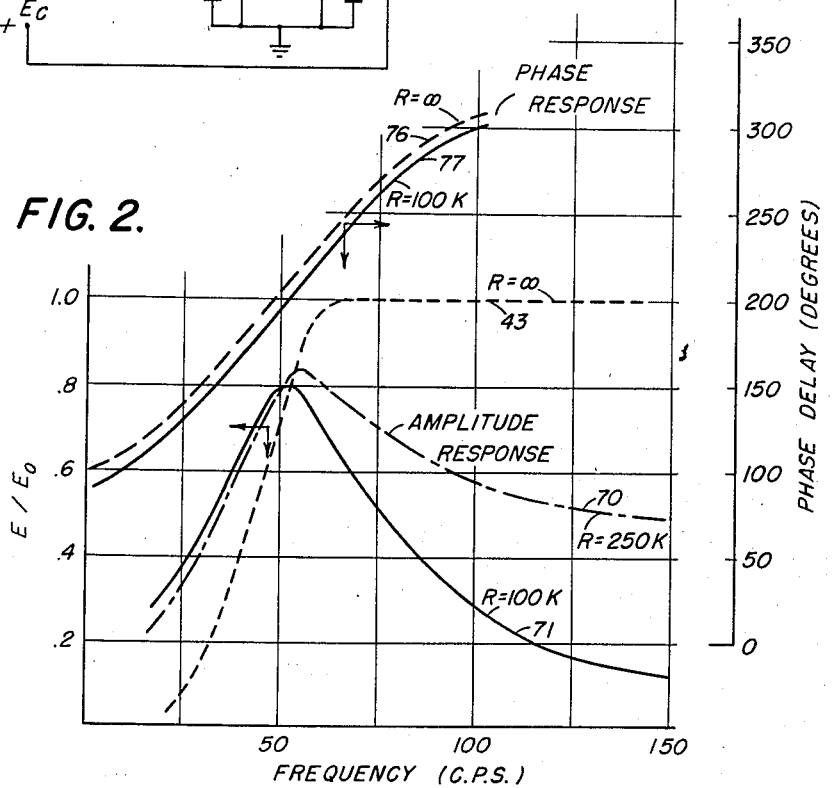
Fig. 2 is a graph illustrating variations produced by operation of the system of Fig. 1.

There are two distinct signal paths leading from input terminals 34 and 35 to output terminals 36 and 37. The first signal path includes a high pass filter which comprises a T network made up of series condensers 40 and 41 and a shunt inductance 42. This filter network comprised of elements 40—42 has a fixed amplitude-frequency response of a well known type such as illustrated in Fig. 2 by the dotted curve 43. Above a certain cutoff frequency there is no attenuation of the high frequencies. Below the "knee" of curve 43 low frequency components are highly attenuated, the slope of the curve being approximately 18 db. per octave. In accordance with the present invention, the first path is selected to give the desired elimination of low frequency components during the early portion of the recording period. A second signal path is provided to transmit a second signal component to output terminals 36 and 37 which at the high frequency end of the spectrum is 180° out-of-phase with the corresponding frequency components of the signal transmitted through the filter 40—42. At the low frequency end the components transmitted to output terminals 36 and 37 by the two separate paths reinforce each other. Further, means are provided for varying the magnitude and the phase of the second components on a frequency selective basis.

More particularly, a transformer 50 is provided with its primary winding 51 connected in parallel with the impedance 33. The transformer 50 preferably has a 1:1 turns ratio so that the voltage in the secondary winding 52 is equal the voltage in the primary. The primary and secondary windings are so connected that when the lower terminal of primary 51 is negative (—), the terminal of secondary winding 52, which is positive (+), is connected to a symmetrical bilaterally conductive variable impedance circuit as by way of conductor 53. The second terminal of the secondary winding 52 is then connected by way of conductor 54, condenser 55 and resistor 56 to the output terminal 36.

The variable impedance circuit comprises a common connection 60 between the anode of a first diode 61 and the cathode of a second diode 62. The cathode of diode 61 is connected by way of the R. C. circuit 63 to ground and by way of a circuit including resistance 64 to the positive terminal of a D. C. source 65. Similarly the anode of diode 62 is connected by way of the R. C. circuit 66 to ground and by way of a circuit including resistance 67 to the negative terminal of the D. C. source 65.

When the voltage output from unit 65 is low, very little impedance is presented by the circuits of diodes 61 and 62. When the voltage is high, the cathode of diode 61 is more positive than its anode and conversely the anode of diode 62 is more negative than its cathode so that the circuit presents a high impedance. The voltage induced in the secondary winding 52 is divided as between the output impedance 44, condenser 55, resistor 56 and the twin diodes 61, 62. Thus the magnitude of the voltage effective across resistance 44 may be made to vary by changing the impedance of the diodes 61, 62.

It will be seen that when the voltage from source 65 is very high, the impedance of the twin diodes 61, 62 is infinity and very little current may flow in secondary winding 52. In this condition, the contribution to the filter output of the operation of the path including winding 52 is negligible and filter output is illustrated as the dashed curve 43, it being remembered that curve 43 represents the amplitude-frequency characteristic of the T network including elements 40, 41, 42.

When the voltage from source 65 is relatively low, current of appreciable magnitude may flow in secondary winding 52 and the filter characteristic will be substantially modified. For example, when the resistance of the twin diode circuit is approximately 250,000 ohms, the filter characteristic is as illustrated by curve 70. When the resistance is further lowered to approximately 100,000 ohms, the total filter characteristic is as illustrated by the solid line curve 71.

It should be noted that the primary effect of variation in the resistance of the twin diode circuit is to rotate the filter characteristic about a cutoff frequency. The high frequencies become attenuated and the frequencies below the cutoff point are reinforced so that the low frequency response is augmented.

The manner in which the filter characteristic is made to vary may be suitably controlled by adjusting or selecting the character of the voltage function produced by unit 65. While details of the unit 65 have not been shown, such systems are well understood by those skilled in the art. For example, relatively complex voltage functions may be produced through the use of control circuits such as illustrated and described in Patent No. 2,656,422 to George B. Loper, a co-worker of applicant's. Other systems may be utilized. For example, a linear change in voltage for unit 65 may be provided by incorporating therein a circuit such as illustrated and described in "Waveforms," volume 19 of the M. I. T. Radiation Laboratory Series, McGraw-Hill, 1949, at page 277 with particular reference to Fig. 7.23.

The unit 65 will be actuated in response to an initial pulse from blaster 12 or its equivalent and transmitted to unit 65 by way of conductor 75. Operation may be such that the voltage from unit 65 is initially high and decreases to a relatively low value as a function of time. The variation illustrated in Fig. 2 may thus be effected. Initially high frequency components are passed unattenuated and low frequency components highly attenuated. The overall filter characteristic is then altered to attenuate high frequency components and to reinforce low frequency components. It should be noted that for the filter circuit illustrated in Fig. 1, very little, if any, error or distortion is introduced in the phase relationships of the waves. Note that for the two extreme conditions, R equals infinity (curve 76) and R equals 100,000 ohms (curve 77), there is little change in relative phase displacement of the various components.

The voltage from unit 65 is applied by way of channel 78 to each of the filters, including filter 23, associated with the amplifiers in the amplifier bank 21.

In Fig. 3 an equivalent circuit has been shown which may be of assistance in understanding the operation of the filter illustrated in Fig. 1. Where appropriate, like parts have been designated by the same reference character. An input voltage E is applied to the T network 40, 41, 42 and current from the latter circuit is applied to the output impedance 44 and produces an output voltage $E_0$ at the output terminals. A like input voltage E causes an additional component of current flow in output impedance 44 by way of a series network including the condenser 55 and resistance 56. The instantaneous polarities of the voltages applied to the two circuits are opposed. For high frequencies, condensers 40, 41, 55 contribute little, if any, impedance to current flow so that the currents flowing in the output impedance 44 are equal in magnitude and opposite in sign. Therefore high frequency components are substantially cancelled. This is true if the variable resistance 80, representative of the twin diodes 61, 62 of Fig. 1, is zero and resistance 56 is relatively small compared to resistance 44. If resistance 80 is very high, the currents flowing therethrough are negligible so that current flowing in resistance 44 is due substantially entirely to current passing through condensers 40, 41. For low frequency components condensers 40, 41 and condenser 55 offer substantial impedance to current flow. However due to the polarities of the two voltages and the phase relations present in the two circuits, the currents in impedance 44 are at least in part in-phase with one another and serve to be additive. The additive effect is further increased as the resistance 80 increases in magnitude. This is because the two signals added in resistance 44 approach zero phase separation more rapidly than the magnitude of the current flowing through resistance 80 decreases due to a rise in the magnitude of resistance 80.

A modified circuit has been illustrated in Fig. 4. The transformer 50 of Fig. 1 has been replaced by a phase inverter tube 90 and the fixed filter network is a low pass filter 91 comprising a series inductance 92 and a pair of shunt condensers 93 and 94. Filter 91 is a conventional low pass filter whose frequency characteristics are modified in accordance with the present invention by operation of twin diode circuit 61, 62. The filter 91 is connected by way of conductor 95 to the cathode of phase inverter tube 90 so that the voltage across the cathode impedance 96 applied to the filter 91 produces a first component of current flow in the output impedance 97. A second component of current flow in impedance 97 is due to current flowing in the path including condenser 98, resistor 99 and inductance 100. Condenser 98 couples the voltage at the anode of the phase inverter tube to the filter network. The juncture intermediate condenser 98 and resistor 99 is connected by way of condenser 101 to the twin diode circuit 61, 62. As is well understood, the voltages at the cathode and anode of tube 90 are equal in amplitude if resistor 96 is of the same resistance as the plate resistor 105. At the same time the voltages are out-of-phase.

In this circuit the operation is basically the opposite of that described in connection with Fig. 1. Initially the filter network passes low frequency components and attenuates high frequency components. However if the voltage applied to the twin diodes 61, 62 decreases, the low frequency components become attenuated and high frequency components to a greater extent are passed to the output impedance 97.

It will be apparent that while operations here above-described have concerned a decrease in the control voltage from unit 65 as a function of time, the voltage may be increased or may be varied in any selectable manner to provide the desired filtering operation. Further it will be apparent that the relatively simple basic filter circuits, the T-network 40, 41 and 42 and the π-network, may be made more complex or may be combined to provide band pass filtering action which may be selectively modified as above described.

The filter network of Fig. 1 was found to be suitable for seismic recording systems when comprised of components set out below. It should be understood, however, that the specifications are exemplary only and are not to be taken by way of limitation.

| | |
|---|---|
| Tube 30 | 12AU7. |
| Condenser 31 | .002 mfd. |
| Resistance 32 | 200 K. |
| Resistance 33 | 150 K. |
| Transformer 50 | 1:1 turns ratio. |
| Condensers 40, 41 | .03 mfd. |
| Inductance 42 | 250 henries. |
| Condenser 55 | .013 mfd. |
| Resistance 56 | 50 k. |
| Resistance 44 | 100 K. |

While preferred forms of the invention have been illustrated and described, it is to be understood that other modifications may now suggest themselves to those skilled in the art, all within the scope of the appended claims.

What is claimed is:

1. In a seismic signal channel for amplifying and recording seismic waves, a filter network having input terminals and output terminals and whose frequency response varies as a predetermined function of time during a wave recording period following a starting signal which comprises a first signal path between said input and output terminals having a fixed amplitude-frequency characteristic and a selected cutoff frequency, a second signal path between said input and output terminals and including means for deriving an inverted signal from said input terminals, a variable impedance in said second path for controlling both the phase and the amplitude of the signal in said path to produce a signal substantially all of whose frequencies to one side of said cutoff frequency reinforce like frequencies of the signal through said first path and substantially all of whose frequencies to the other side of said cutoff frequency attentuate like frequencies of the signal through said first path, and means for varying said variable impedance as a predetermined function of time following said starting signal.

2. In a seismic signal channel for recording seismic waves, a filter network having input terminals and output terminals whose frequency response varies as a predetermined function of time during a wave recording period following a starting signal which comprises a first signal path between said input and output terminals having a fixed amplitude-frequency response, a second signal path between said input and output terminals and including means for deriving an inverted signal from said input terminals, a symmetrical bilaterally conductive variable impedance connected in a shunting relation across said second path for controlling the phase and amplitude of the signal in said second path, and means for varying said impedance as a predetermined function of time following said starting signal.

3. A signal channel for amplifying and filtering electrical signals which comprises a filter network having an input and an output circuit and including a first signal path between said input circuit and said output circuit having a fixed amplitude-frequency characteristic and a selected cutoff frequency, a second path between said input circuit and said output circuit and including means for deriving an inverted signal from said input circuit, a variable impedance in said second path for controlling both the phase and the amplitude of the signal in said path to produce a signal substantially all of whose frequencies to one side of said cutoff frequency reinforce like frequencies of the signal through said first path and substantially all of whose frequencies to the other side of said cutoff frequency attentuate like frequencies of the signal through said first path, and means for varying said variable impedance to alter the overall amplitude-frequency characteristic of said filter.

4. A signal channel for amplifying and filtering electrical signals comprising a filter network having input terminals and output terminals and including a first signal path between said input terminals and said output terminals having a fixed amplitude-frequency characteristic and a selected cutoff frequency, a second path between said input terminals and said output terminals and including means for deriving an inverted signal from said input terminals, a symmetrical bilaterally conductive variable impedance connected in a shunting relation in said second path adapted to control the phase-amplitude characteristic of said second path to produce a signal substantially all of whose frequencies to one side of said cutoff frequency reinforce like frequencies of the signal through said first signal path and substantially all of whose frequencies to the other side of said cutoff frequency attenuate like frequencies of the signal through said first path, and means for varying said impedance in accordance with a predetermined function to vary the overall amplitude-frequency characteristic of said filter network in accordance with said function.

5. In a seismic signal channel for amplifying and recording seismic waves, a filter network having input terminals and output terminals whose frequency response may be varied as a predetermined function of time which comprises a first signal path between said input terminals and said output terminals and including a filter of fixed characteristics to pass substantially unattenuated frequencies on one side of a cutoff frequency and to substantially attenuate frequencies on the other side of said cutoff frequency, a second signal path between said input terminals and said output terminals and including means for deriving an inverted signal from said input terminals for blending at said output terminals with the signal transmitted by way of said first path, a symmetrical bilateral impedance connected in a shunting relation in said second path for controlling the amplitude and magnitude of the signal transmitted by way of said second path, and means for varying said impedance in accordance with a predetermined function of time to produce significant attenuation of frequencies on one side of said cutoff frequency and to reduce the attenuation on the other side of said cutoff frequency in dependence upon said predetermined function of time.

6. In a seismic signal channel for recording seismic waves, a filter network having input terminals and output terminals whose frequency response varies as a predetermined function of time during a wave recording period following a starting signal which comprises a first signal path between said input terminals and output terminals including a first series reactance and a shunt reactance forming a filter having a fixed amplitude-frequency response, a second signal path between said input and output terminals and including at least a series reactance of the same character as said first series reactance and a means for deriving an inverted signal from said input terminals, a symmetrical bilaterally conductive variable impedance connected in a signal shunting relation in said second signal path for controlling the phase and amplitude of the signal in said second path, and means for varying said impedance as a predetermined function of time following said starting signal.

7. In a seismic signal channel for recording seismic waves, a filter network having input terminals and output terminals and whose frequency response varies as a predetermined function of time during a wave recording period which comprises a first signal path between said input terminals and said output terminals including a filter of fixed amplitude-frequency response having at least one series reactance element, a second path between said input terminals and said output terminals having a series element of the same character as said one reactance element and also including means for deriving an inverted signal from said input terminals, a time variable impedance in circuit with said second path for controlling the phase and amplitude of the signal in said second path, and means for varying said impedance as a predetermined function of time during said recording period.

8. A signal channel for amplifying and filtering electrical signals comprising a filter network having input terminals and output terminals, a first signal path between said input terminals and said output terminals, a filter included in said first signal path, said filter having a fixed amplitude-frequency response and including at least one series reactance element, a second path between said input terminals and said output terminals and having a series reactance element of the same character as said one series reactance element, the value of said series reactance element in said first path being substantially equal to the value of the series reactance element in said second path, means for deriving an inverted signal from said input terminals, a time variable impedance in circuit with said second path for controlling the phase and amplitude of the signal in said second path, and means for varying said variable impedance as a predetermined function of time to vary the over-all amplitude-frequency characteristic of said filter network in accordance with said function.

References Cited in the file of this patent

UNITED STATES PATENTS

| | | |
|---|---|---|
| 2,298,177 | Scott | Oct. 6, 1942 |
| 2,528,885 | Hendricks | Nov. 7, 1950 |
| 2,585,854 | Scott | Feb. 12, 1952 |
| 2,589,133 | Purington | Mar. 11, 1952 |
| 2,590,822 | Minton | Mar. 25, 1952 |